Feb. 24, 1931.    J. G. VINCENT    1,794,095
MOTOR VEHICLE
Filed April 20, 1927    2 Sheets-Sheet 1

Inventor
JESSE G. VINCENT.
By Milton Tibbetts
Attorney

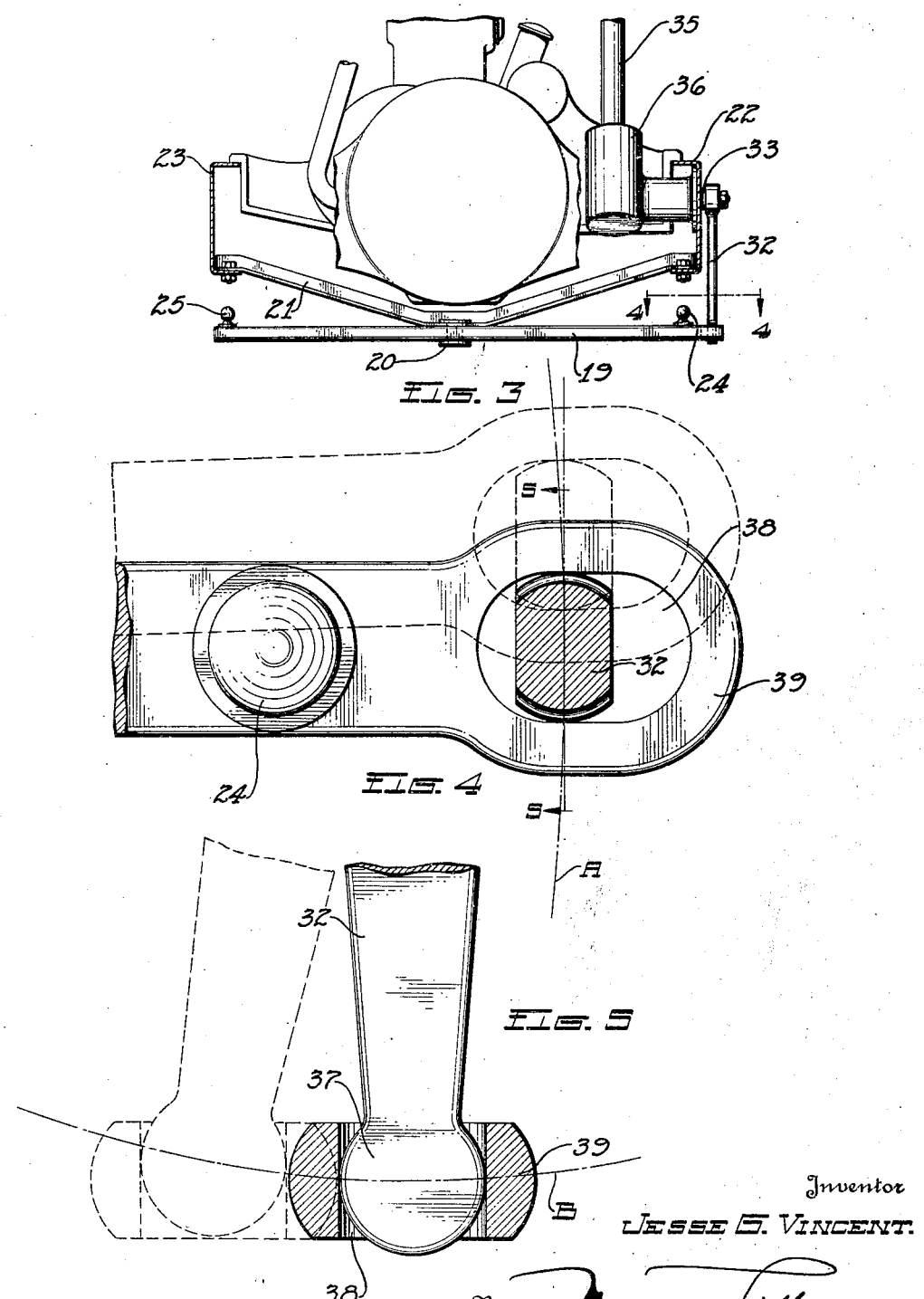

Patented Feb. 24, 1931

1,794,095

UNITED STATES PATENT OFFICE

JESSE G. VINCENT, OF DETROIT, MICHIGAN, ASSIGNOR TO PACKARD MOTOR CAR COMPANY, OF DETROIT, MICHIGAN, A CORPORATION OF MICHIGAN

MOTOR VEHICLE

Application filed April 20, 1927. Serial No. 185,146.

This invention relates to motor vehicles and more particularly to steering gear therefor.

The steering gear ordinarily used in connection with motor vehicles is subject to certain disadvantages, because of inherent geometrical errors. For example, when the front wheels of a motor vehicle strike an obstruction, such as a cross walk, and the front springs are depressed simultaneously, the front axle describes an arc having a radius substantially equal to the length of the front spring from the center of the axle to the point of stationary pivotal attachment of the spring to the frame. On the other hand, the end of the steering knuckle lever describes an arc having a different radius determined by the effective length of the drag link. The resultant movement of the steering knuckle lever relative to the axle, causes an undesired movement of the wheels. Heretofore, attempt has been made to reduce this undesired movement by shackling the front springs at their front end instead of at the rear end and by slinging the spring underneath the axle instead of mounting it on top of the axle. Although this arrangement partly corrects the error by making the arcs more nearly concentric, it is not a complete correction, because the error, resulting from inequality of the radii, remains. Since the front wheels are usually held together by a steering cross tube, they both move in the same direction and, hence mutually amplify each other's movements.

Moreover, it has heretofore not been possible conveniently to provide a fly-wheel supercharger compressor at the front of the engine of a motor vehicle, equipped with the usual type of steering gear, because the steering cross tube ordinarily occupies the space where the fly-wheel compressor housing would be positioned. The present trend toward the use of superchargers on motor vehicle engines has made it desirable to connect the supercharger compressor to the fly-wheel and this practically necessitates locating the fly-wheel at the front of the engine.

An object of the present invention is to reduce undesired movement or "shimmy" of the wheels of a motor vehicle.

Another object is to provide a steering gear for a motor vehicle, wherein the steering cross tube is replaced by a cross rock lever, which is so positioned as to enable a fly-wheel supercharger compressor to be located on the front end of the engine.

A feature of the invention is a steering gear for a motor vehicle having a cross rock lever located underneath the rear end of the engine crankcase with links disposed substantially parallel and at opposite sides of the engine connecting the steering knuckle levers on the front wheels with the cross rock lever, to allow space for a fly-wheel supercharger compressor at the front of the engine.

A specific feature is a means adapted to connect the rock shaft lever to the cross rock lever and to allow play in certain directions between the ends of these levers but to prevent play in another direction.

A further feature is a brace adapted to suspend a cross rock lever below the crankcase of the engine.

Other features and objects of the invention will appear from the following description taken in connection with the drawings, wherein:

Fig. 3 is an enlarged partial front view partly in section showing the method of supporting the cross rock lever;

Fig. 4 is an enlarged view in section through the steering lever on line 4—4 of Fig. 3, and Fig. 5 is an enlarged view in section on line 5—5 of Fig. 4.

Figure 1:
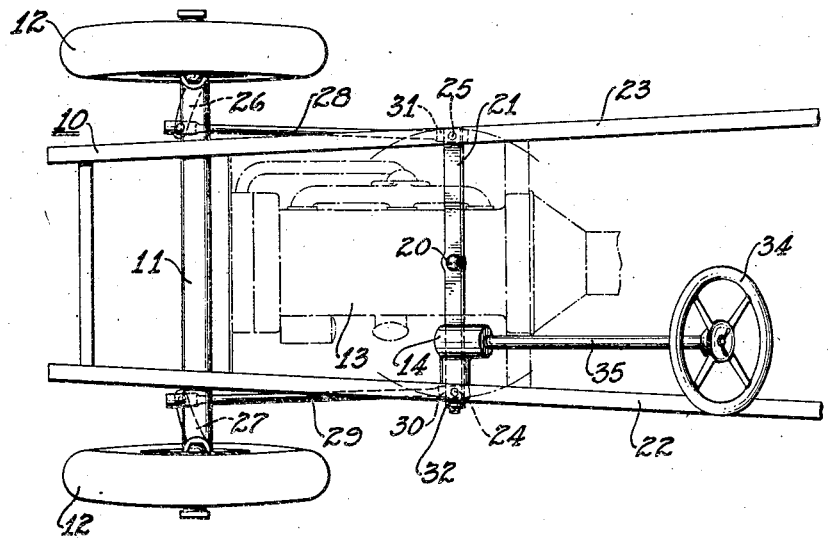
Fig. 1 is a partial plan view of the chassis of a motor vehicle embodying a steering gear in accordance with this invention.
Figure 2:
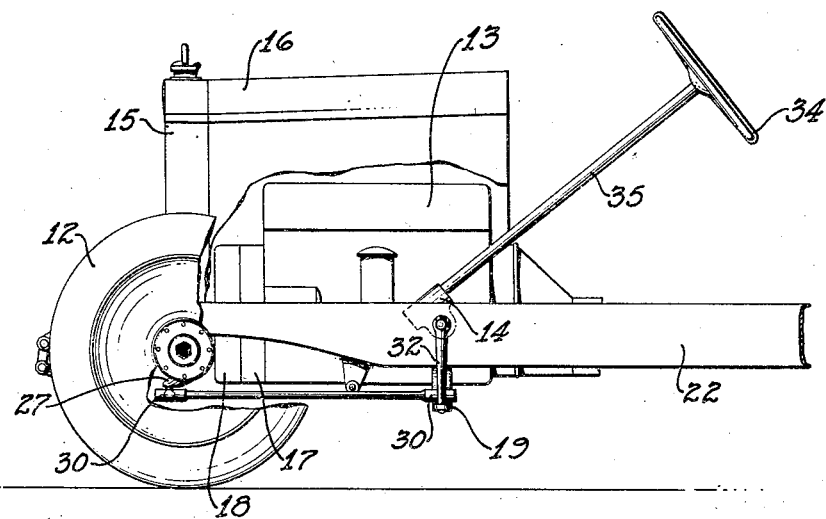
Fig. 2 is a partial side view of the chassis shown in Fig. 1.

In Figs. 1 and 2 a portion of the chassis of a motor vehicle is shown which includes a frame 10, a front axle 11, and front wheels 12, the axle being attached to the frame by means of springs not shown. The chassis also includes an engine 13, a steering gear 14, a radiator 15 and a bonnet 16, the radiator and bonnet being shown only in Fig. 2. The engine 13 has a fly-wheel enclosed in a casing 17 and a supercharger compressor enclosed in a casing 18. The fly-wheel and compressor are connected together and positioned adjacent to each other at the front end of the engine. The engine fly-wheel and supercharger may be considered as represented diagrammatically by the casings 17 and 18.

In order to provide space for the fly-wheel 17 and compressor 18 at the front of the engine, the steering gear 14 is provided with a cross rock lever 19 attached by a pivot 20 to a depending cross member 21 attached to the side rails 22 and 23 of the frame at the rear end of the engine as shown in Fig. 3. The member 21 extends beneath the rear end of the engine crankcase. The cross rock lever 19 has attached near its opposite ends, the ball joint members 24 and 25. The front wheels 12 are provided with the usual steering knuckle levers 26 and 27. Links 28 and 29 located on opposite sides of the engine have their ends each provided with ball joint sockets 30 and 31. These sockets are adapted, at one end, to fit over the ball joint members 24 and 25, respectively, of the cross rock lever and, at the other end, to fit over corresponding ball joint members on the respective steering knuckle levers 26 and 27. A rock shaft lever 32 has its upper end attached to a cross rock shaft 33 whereby the rock shaft lever 32 is adapted to be oscillated in a vertical plane under control of a steering wheel 34 acting through a steering shaft 35 and a gear 36. The elements 34, 35 and 36 may be of any conventional type. The lower end of the rock shaft lever 32 and the method of connecting this lever to the cross rock lever are illustrated in detail in Figs. 4 and 5.

The lever 32 includes an enlarged portion 37 inserted in an elongated slot 38 provided in an enlarged end 39 of the cross rock lever 19. One dimension of the slot 38 is longer than the corresponding dimension of the end of the lever 32 so that a certain amount of play in a horizontal plane, in a direction along the longer dimension of the slot is provided as indicated by the dotted line position of the levers in Fig. 4, to allow relative movement of the engaging portions of the levers in this direction. This play is necessary, because the ends of these levers, in operation, describe arcs in different planes and of unequal radii as shown by the broken lines A and B, Figs. 4 and 5. The end 37 of the lever 32 is also free to move in a vertical plane, relative to the end of the cross rock lever, as shown by the dotted line position in Fig. 5. On the other hand, no play is permitted in a horizontal plane, in a direction at right angles to the cross rock lever 19, because the end 37 of lever 32 fits snugly against the sides of the slot. Only sufficient clearance is provided between these sides and the end of the lever to allow the sliding movement above mentioned to take place.

In the operation of this steering gear, the lever 32 is oscillated by rotation of the steering wheel 34 and the movement of this lever is imparted to the cross rock lever 19, which is accordingly oscillated in a horizontal plane, about its pivot 20 as shown by broken lines in Fig. 1. The movement of the cross rock lever causes one of the links 28 and 29 to move forward and the other to simultaneously move backward, hence the wheels 12 are both turned either to the left or to the right.

This steering gear has the advantage over the ordinary type in that the steering knuckle levers 26 and 27 are not rigidly connected together by a transverse steering cross tube. Accordingly, when the wheels strike an obstruction, the geometrical error in the steering gear, heretofore explained, causes the wheels 12 to both either toe-in or turn out, as the case may be. This is because of the fact that the steering knuckle levers are connected to separate links, which are independently pivoted. The movements of the wheels, accordingly, instead of being amplified are opposed and there is no tendency for the car to swerve to the right or to the left, when the front wheels strike an obstruction, and the tendency for the wheels to "shimmy" or undergo undesired movement is reduced.

Another advantage of the arrangement herein described is that it enables the supercharger compressor to be connected directly to the fly-wheel, because the fly-wheel is positioned at the front of the engine, the cross rock lever being underslung beneath the rear end of the crankcase, as already explained, so as not to interfere with the fly-wheel and supercharger compressor casing. The connection between the steering lever and the cross rock lever has the advantage that it allows relative movement between these members in desired directions but provides a positive engagement in another direction, whereby effective control of the front wheels by the steering wheel is secured. Moreover the steering gear herein described is simple in construction and operation and may be readily manufactured and assembled, because the parts do not require new or complex tools or methods in their construction.

Although this invention has been described in connection with a specific embodiment, it is not to be understood as limited to the exact details of construction herein shown and described, but is to be limited only as indicated by the scope of the appended claims.

What is claimed is:

1. In a motor vehicle steering gear, a steering wheel, a steering shaft connected to said wheel, a lever connected to said shaft, a vertically pivoted cross rock lever slidably connected to said lever, and link members connected to said cross rock lever.

2. In a motor vehicle steering gear, a lever, an enlarged head on said lever, and a pivoted cross rock lever having an enlarged end, said end being slotted to receive the enlarged head of said lever, said slot having one dimension substantially equal to the corresponding dimension of said lever head and the other dimension greater than the corresponding dimension of said head.

3. In a motor vehicle, in combination, means for steering the wheels of the vehicle comprising a cross rock lever having a slot adjacent one end thereof, a rock shaft lever having a portion positioned in said slot, a steering knuckle lever for each of the wheels of the vehicle, a link connecting each steering knuckle lever with the cross rock lever and a manually rotatable shaft connected to actuate the rock-shaft lever.

4. In a motor vehicle steering gear, a depending pivoted lever, a pivoted cross rock lever, a sliding connection between the lever and cross rock lever providing for rocking the levers in different planes, and steering links connected to the ends of the cross rock lever.

5. In a motor vehicle steering gear, a depending rock-shaft lever, a cross rock lever, a sliding connection between the rock-shaft lever and the cross rock lever providing for rocking the levers in different planes and of unequal radii, steering knuckle levers, a link connecting each steering knuckle lever to the cross rock lever, and means for actuating the rock-shaft lever.

6. In a motor vehicle, a frame including side members, an engine carried on the forward portion of the side frames, a front axle in advance of the engine, wheel steering knuckles pivotally connected to the ends of the front axle, parallel links connected to the knuckles, said links being outside of the sides of the engine, a cross rock lever pivoted to the frame beneath the engine, and means including a manually operable lever for actuating the cross rock lever, said lever being slidably associated with the rock lever.

In testimony whereof I affix my signature.

JESSE G. VINCENT.